(12) United States Patent
Suda

(10) Patent No.: US 8,229,293 B2
(45) Date of Patent: Jul. 24, 2012

(54) IMAGING APPARATUS AND IMAGING METHOD

(75) Inventor: Hirofumi Suda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 12/209,342

(22) Filed: Sep. 12, 2008

(65) Prior Publication Data
US 2009/0009655 A1 Jan. 8, 2009

Related U.S. Application Data

(63) Continuation of application No. 11/460,419, filed on Jul. 27, 2006, now Pat. No. 7,536,098.

(30) Foreign Application Priority Data

Aug. 5, 2005 (JP) ................................. 2005-228472

(51) Int. Cl.
*G03B 17/00* (2006.01)
*H04N 5/225* (2006.01)

(52) U.S. Cl. ....................................... 396/153; 348/360

(58) Field of Classification Search .................. 396/153, 396/275, 427; 348/152, 154–155, 360
See application file for complete search history.

(56) References Cited

U.S. PATENT DOCUMENTS

| | | | |
|---|---|---|---|
| 4,437,111 A * | 3/1984 | Inai et al. ................... 348/222.1 |
| 4,695,878 A | 9/1987 | Levine et al. ................... 358/44 |
| 4,920,369 A | 4/1990 | Kaneda et al. ................ 354/400 |
| 4,980,773 A | 12/1990 | Suda et al. ..................... 358/227 |
| 5,200,860 A | 4/1993 | Hirasawa et al. ............. 359/696 |
| 5,488,687 A | 1/1996 | Rich ............................. 395/164 |
| 6,801,716 B2 | 10/2004 | Takeuchi ........................ 396/61 |
| 6,930,716 B2 | 8/2005 | Yoshida ........................ 348/322 |
| 7,224,396 B2 | 5/2007 | Oochi et al. .................. 348/345 |
| 2002/0030755 A1 | 3/2002 | Uchino ......................... 348/342 |
| 2002/0039135 A1 | 4/2002 | Heyden ........................ 348/143 |
| 2005/0036776 A1 | 2/2005 | Yasuda et al. .................. 396/72 |
| 2005/0275744 A1 | 12/2005 | Yasuda ......................... 348/345 |

FOREIGN PATENT DOCUMENTS

| | | |
|---|---|---|
| CN | 1473428 A | 2/2004 |
| CN | 2603983 Y | 2/2004 |
| GB | 2 400 999 A | 10/2004 |
| JP | 32-8346 B | 9/1957 |

(Continued)

OTHER PUBLICATIONS

Oct. 31, 2008 Extended European Search Report in European Patent Appln. No. 06015834.2.

(Continued)

*Primary Examiner* — W. B. Perkey
*Assistant Examiner* — Minh Phan
(74) *Attorney, Agent, or Firm* — Fitzpatrick, Cella, Harper & Scinto

(57) ABSTRACT

An apparatus suitably detects a recording trigger even in a low-brightness or low-light-intensity environment, and acquires, from a recorded image, a high-quality image from which a person or the like can be easily recognized. When a recording trigger is to be detected, this apparatus disables an infrared reduction filter, so a recording trigger can be suitably detected even in an environment in which the brightness or light intensity is low. When an image is to be recorded, this apparatus records a color image by enabling the infrared reduction filter.

6 Claims, 8 Drawing Sheets

FOREIGN PATENT DOCUMENTS

| | | |
|---|---|---|
| JP | 40-26568 Y | 9/1965 |
| JP | 48-60628 A | 8/1973 |
| JP | 55-90192 A | 7/1980 |
| JP | 57-130006 A | 8/1982 |
| JP | 57-133411 A | 8/1982 |
| JP | 57-150808 A | 9/1982 |
| JP | 59-146270 A | 8/1984 |
| JP | 59-222803 A | 12/1984 |
| JP | 4-18888 A | 1/1992 |
| JP | 4-117876 A | 4/1992 |
| JP | 5-145859 A | 6/1993 |
| JP | 6-89390 A | 3/1994 |
| JP | 6-113191 A | 4/1994 |
| JP | 9-186939 A | 7/1997 |
| JP | 2000-132774 A | 5/2000 |
| JP | 2000-278593 A | 10/2000 |
| JP | 3074017 U | 12/2000 |
| JP | 2001-251607 A | 9/2001 |
| JP | 2001-313933 A | 11/2001 |
| JP | 2002-016877 | 1/2002 |

OTHER PUBLICATIONS

Nov. 9, 2007 Official Action in Chinese Patent Appln. No. 2006101095305 (with translation).

* cited by examiner

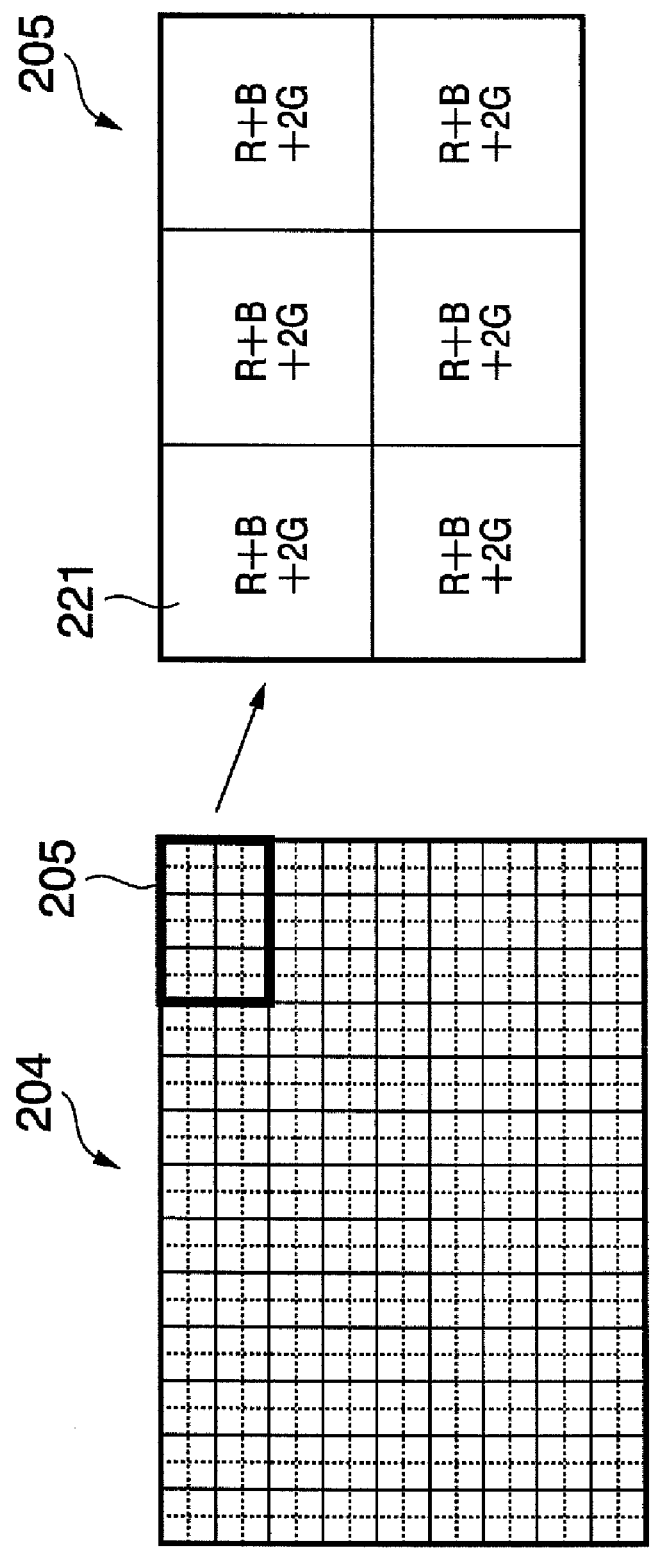

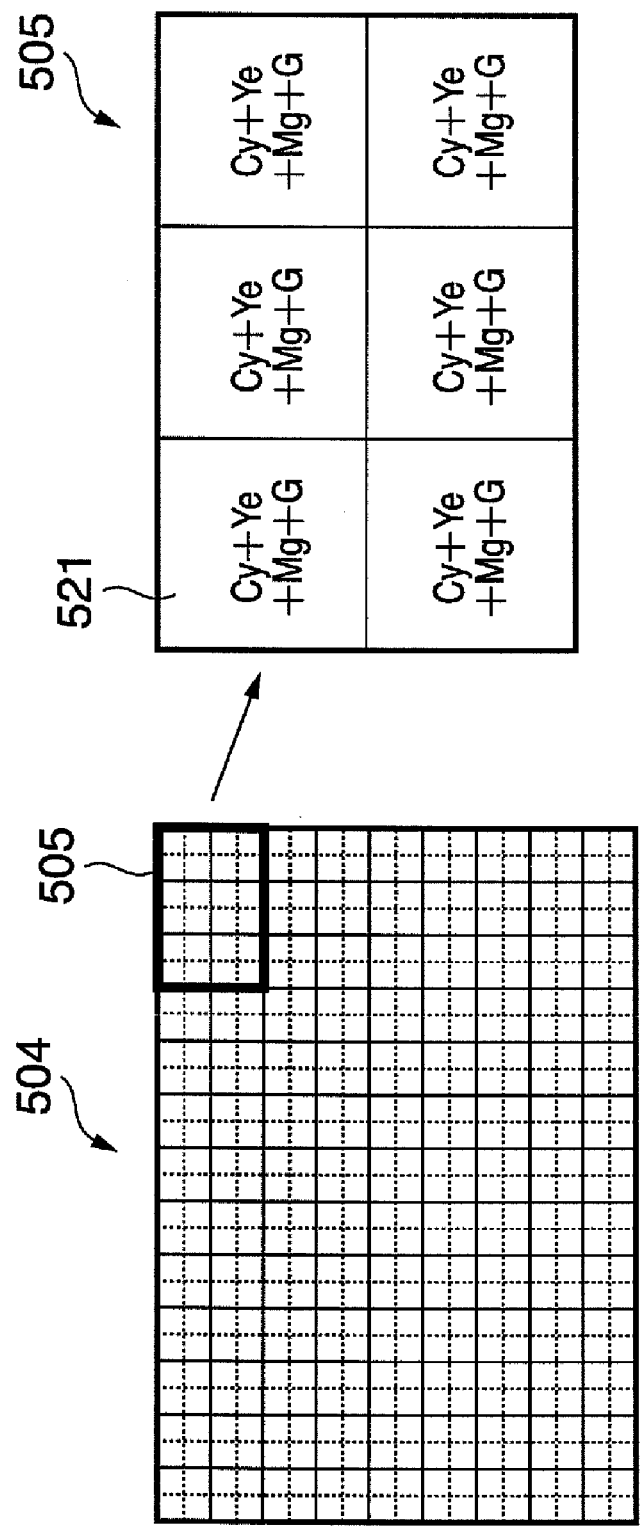

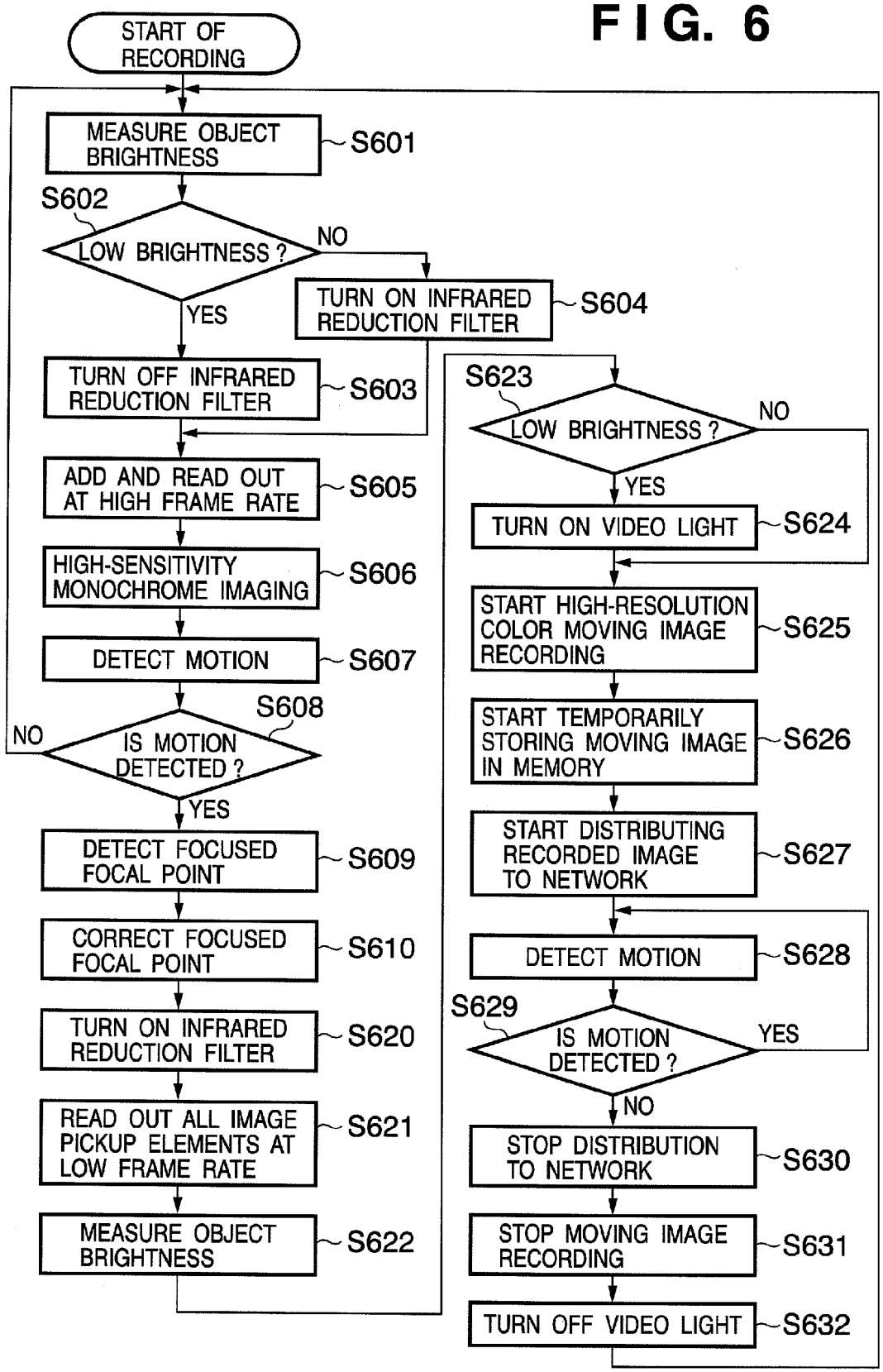

IMAGING APPARATUS AND IMAGING METHOD

This application is a continuation of application Ser. No. 11/460,419 filed Jul. 27, 2006.

BACKGROUND OF THE INVENTION

1. Field of the Invention

This invention relates to a technique for automatically recording images such as still images and moving images.

2. Description of the Related Art

A security system for automatically recording images such as still images and moving images by a security camera and recording the images on a recording medium is conventionally known. Although the quality of the recorded image is desirably as high as possible, it is also desirable to increase the recording time as long as possible. However, there is a tradeoff relationship between the image quality and recording time, so it is generally difficult to achieve high image quality and long-term recording simultaneously.

Accordingly, a security system which performs recording at high resolution in scenes regarded as important and performs recording at low resolution in scenes not regarded as important is proposed (Japanese Patent Laid-Open No. 2002-016877). This security system determines the importance of a scene on the basis of the motion of an object.

To perform monitoring for a longer period of time, it is only necessary to record no images in (normal) scenes with no motion, and record images in (abnormal) scenes with motion. This makes it possible to preserve the recording medium.

In a security system which records an image only when an abnormality is detected, however, no images are recorded in normal scenes, so nothing may be recorded if the detection of an abnormality has failed.

A monitoring environment in which the detection of an abnormality easily fails is principally an environment in which the brightness or light intensity is low. Especially when the number of image pickup elements of an imaging device is increased to increase the resolution, the effective light receiver area per image pickup element is normally reduced. Since the sensitivity lowers accordingly, the possibility of an abnormality detection failure increases more and more.

SUMMARY OF THE INVENTION

The present invention makes it possible to suitably detect a recording trigger even in a low-brightness or low-light-intensity environment by disabling an infrared reduction filter. When recording is to be performed, on the other hand, a color image is recorded by enabling the infrared reduction filter. Accordingly, a person or the like can be readily recognized from a recorded image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B is a view for explaining the imaging device when the infrared reduction filter according to the embodiment is moved away from the light path;

FIG. 5B is a view for explaining the imaging device when the infrared reduction filter according to the embodiment in FIG. 5A is moved away from the light path; and FIG. 6 is a flowchart illustrating a moving image recording method according to the embodiment in FIGS. 5A and 5B.

DESCRIPTION OF THE EMBODIMENTS

Preferred embodiments of the present invention will now be described in detail in accordance with the accompanying drawings.

First Embodiment

Figure 1:
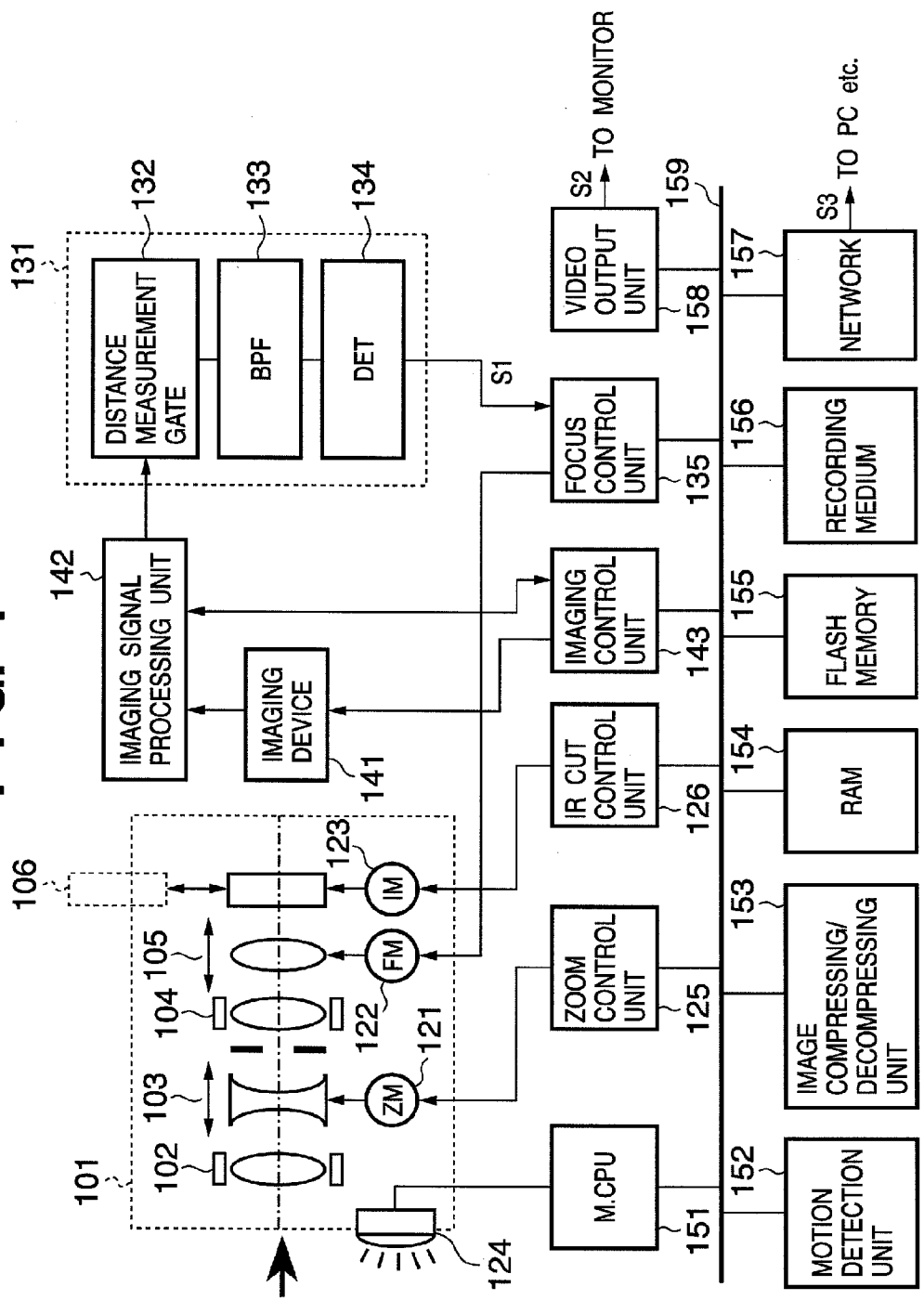
FIG. 1 is a block diagram showing an example of the arrangement of an imaging apparatus according to an embodiment.

FIG. 1 is a block diagram showing an example of the arrangement of an imaging apparatus according to an embodiment. This imaging apparatus (to be referred to as a camera hereinafter) is a so-called security camera, video camera, or digital still camera. The camera may also be, e.g., a camera which records images such as moving images and still images, and transmits the images outside via a network. Other examples of the camera are a camera which outputs video signals outside, and a camera which records images on a recording medium (e.g., a tape, semiconductor memory, optical disk, or magnetic disk).

Referring to FIG. 1, the individual units in the camera are connected via a bus 159, and comprehensively controlled by a main CPU 151. A lens unit 101 includes, e.g., a fixed lens 102, zoom lens 103, aperture stop, fixed lens 104, and focusing lens 105. An object is imaged by forming an optical image of the object on an imaging device 141 through these optical members. A zoom control unit 125 drives the zoom lens 103 via a zoom motor 121 in accordance with instructions from the main CPU 151.

An infrared reduction filter 106 is an optical filter which reduces or intercepts light components in the infrared band. The infrared reduction filter 106 is driven by a driving motor 123, and placed in or moved away from a light path of the lens unit 101. The driving motor 123 is controlled by an infrared reduction control unit 126. The driving motor 123 and infrared reduction control unit 126 are exemplary means for moving the infrared reduction filter 106. Note that when the infrared reduction filter 106 is placed in the light path, the object image formed on the imaging device 141 contains no light in the infrared band. When the infrared reduction filter 106 is moved away from the light path, the object image formed on the imaging device 141 contains light in the infrared band.

A lighting device 124 emits light or is lit in synchronism with the recording timing in accordance with instructions from the CPU 151. Since an object is illuminated by this light, an image of the object can be clearly recorded even when the brightness is low. An example of the lighting device for still image recording is a flash light unit which instantaneously emits light. An example of the lighting device for moving image recording is a video light unit capable of continuous lighting.

The image formed on the imaging device 141 is photoelectrically transduced, and input as an image signal to an imaging signal processing unit 142. A CCD sensor or CMOS sensor can be used as the imaging device 141. The imaging signal processing unit 142 performs A/D conversion and other image processing on the input image signal. After that, the image signal is input to a focal point detection unit 131.

An imaging control unit 143 sets the imaging resolution, image signal read method, frame rate, and the like of the imaging device 141. The image signal read method is, e.g., addition read or all image pickup elements read (to be described later). The imaging signal processing unit 142 also executes signal processing matching various conditions such as the resolution and frame rate designated by the imaging control unit 143, and disable/enable of the infrared reduction filter 106.

A motion detection unit 152 is an example of a unit which detects a change relating to an object. Another detection unit may also be used as long as the unit can suitably detect a recording trigger. The motion detection unit 152 stores several images processed by the imaging signal processing unit 142 into a RAM 154 in the order of recording. The motion detection unit 152 determines whether there is a motion by correlating a plurality of images.

The focal point detection unit 131 includes at least one distance measurement gate 132, at least one bandpass filter (BPF) 133, and at least one wave detector 134. The distance measurement gate 132 extracts a partial image signal forming an image. The bandpass filter (BPF) 133 extracts a predetermined hi-frequency component contained in the image signal. This hi-frequency component is a frequency component effective to determine an evaluated value of autofocusing. The cutoff frequency of the BPF 133 is experimentally determined. The wave detector 134 performs a wave detection process such as peak holding or integration, and outputs an AF evaluated value S1. The AF evaluated value S1 is input to a focus control unit 135. Note that if a plurality of distance measurement gates 132, a plurality of BPFs 133, and a plurality of wave detectors 134 exist, a plurality of signals are output as AF evaluated values S1 accordingly. The focus control unit 135 executes autofocusing control on some or all of the evaluated values S1. On the basis of the AF evaluated value S1, the focus control unit 135 detects a position (focused focal point) at which the AF evaluated value S1 is at a maximum. The focus control unit 135 then drives the focusing motor 122 to move the focusing lens 105 to the focused focal point. In this manner, autofocusing (AF) is realized.

The image signal processed by the imaging signal processing unit 142 is temporarily stored as image data in the RAM 154. The image data stored in the RAM 154 is compressed by an image compressing/decompressing unit 153. The CPU 151 may record the compressed image data on a recording medium 156. The CPU 151 may also transmit the compressed image data outside as a network signal S3 via a network interface 157. The CPU 151 may also output the image data as a video signal S2 from a video output unit 158 to a TV monitor or PC monitor in parallel with the recording process.

Note that when the camera is activated, a control program stored in a flash memory 155 is loaded into a portion of the RAM 154. The CPU 151 controls the individual units as described above in accordance with the program loaded into the RAM 154.

Figure 2A:
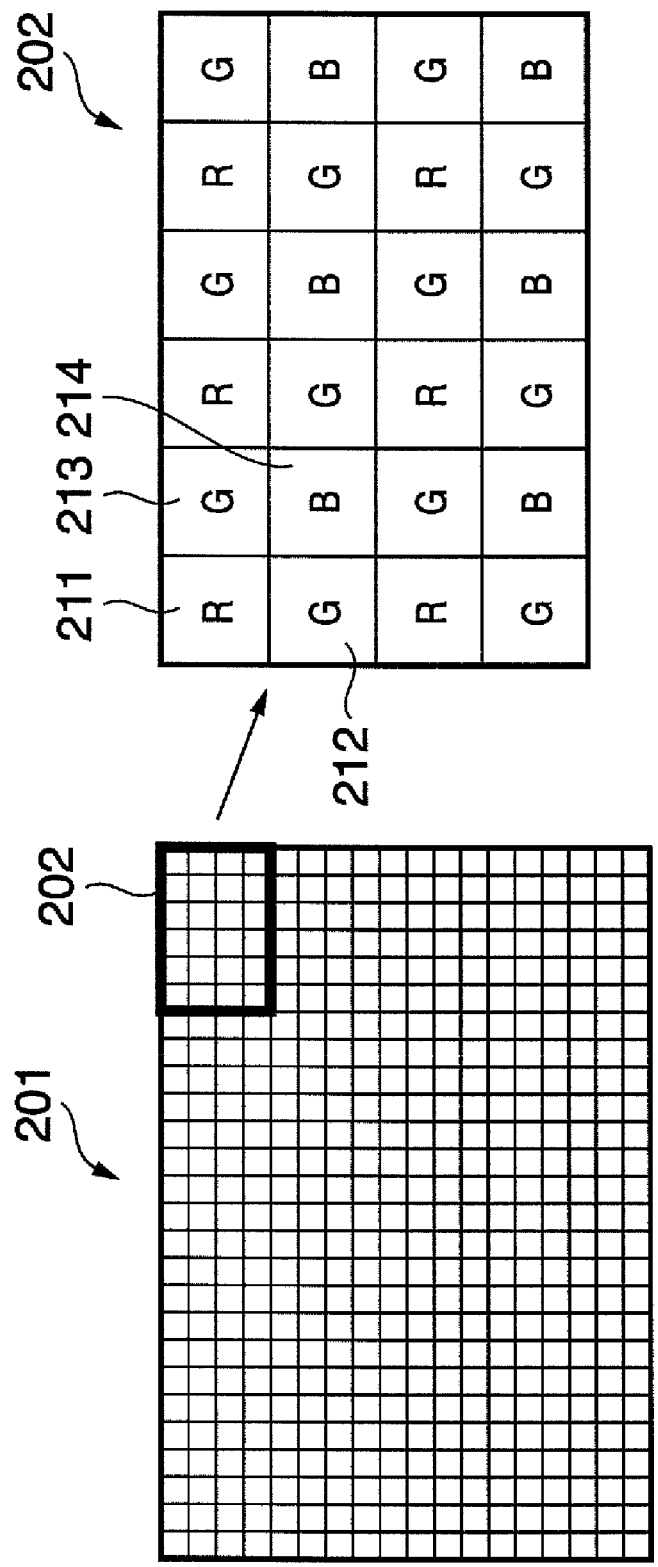
FIG. 2A is a view for explaining the relationship between an infrared reduction filter according to the embodiment and an imaging device when the filter is placed in a light path.

FIG. 2A is a view for explaining the relationship between the infrared reduction filter according to the embodiment and the imaging device when the filter is placed on the light path. Reference numeral 201 represents the whole effective region of the imaging device to which primary color filters are adhered. In a normal recording operation, the whole effective region is an imaging region for acquiring an image. However, when special recording such as electronic camera shake prevention is to be performed, a portion of the whole effective region is sometimes used as an imaging region. Each square in FIG. 2A indicates one photoelectric transducer. Reference numeral 202 denotes a partial region of the imaging device; 211, a photoelectric transducer to which a red filter is adhered; 212 and 213, photoelectric transducers to which green filters are adhered; and 214, a photoelectric transducer to which a blue filter is adhered. The imaging signal processing unit 142 reads out an image signal from each photoelectric transducer, and forms a high-resolution color image on the basis of the relationship between the photoelectric transducer and primary color filter.

FIG. 2B is a view for explaining the imaging device when the infrared reduction filter according to the embodiment is moved away from the light path. Like reference numeral 202, reference numeral 204 denotes the whole effective region of the imaging device. Reference numeral 205 denotes a partial region of the imaging device. FIG. 2B particularly shows that signals from the four photoelectric transducers 211, 212, 213, and 214 are added and read out as a signal of R+B+2G. Reference numeral 221 denotes a photoelectric transducer group including the four photoelectric transducers 211, 212, 213, and 214. As shown in FIG. 2B, the light receiver area of the photoelectric transducer group is four times that of one photoelectric transducer. This means that the sensitivity increases.

When the infrared reduction filter 106 is not placed in the light path, all light components in the infrared band are transmitted. Accordingly, no clear color separation can be realized by the R, G, and B filters. Also, when signals from the four photoelectric transducers are added and read out, pieces of color information cancel each other out, so only a brightness signal can be obtained. However, there is also the advantage that an image signal having fourfold sensitivity can be obtained. Therefore, the imaging signal processing unit 142 forms a high-sensitivity, monochrome image by using the image signal obtained at the fourfold sensitivity. Note that in the state shown in FIG. 2B, the number of image signals to be read out is reduced to ¼. As a result, the frame rate is easily increased.

Figure 3:
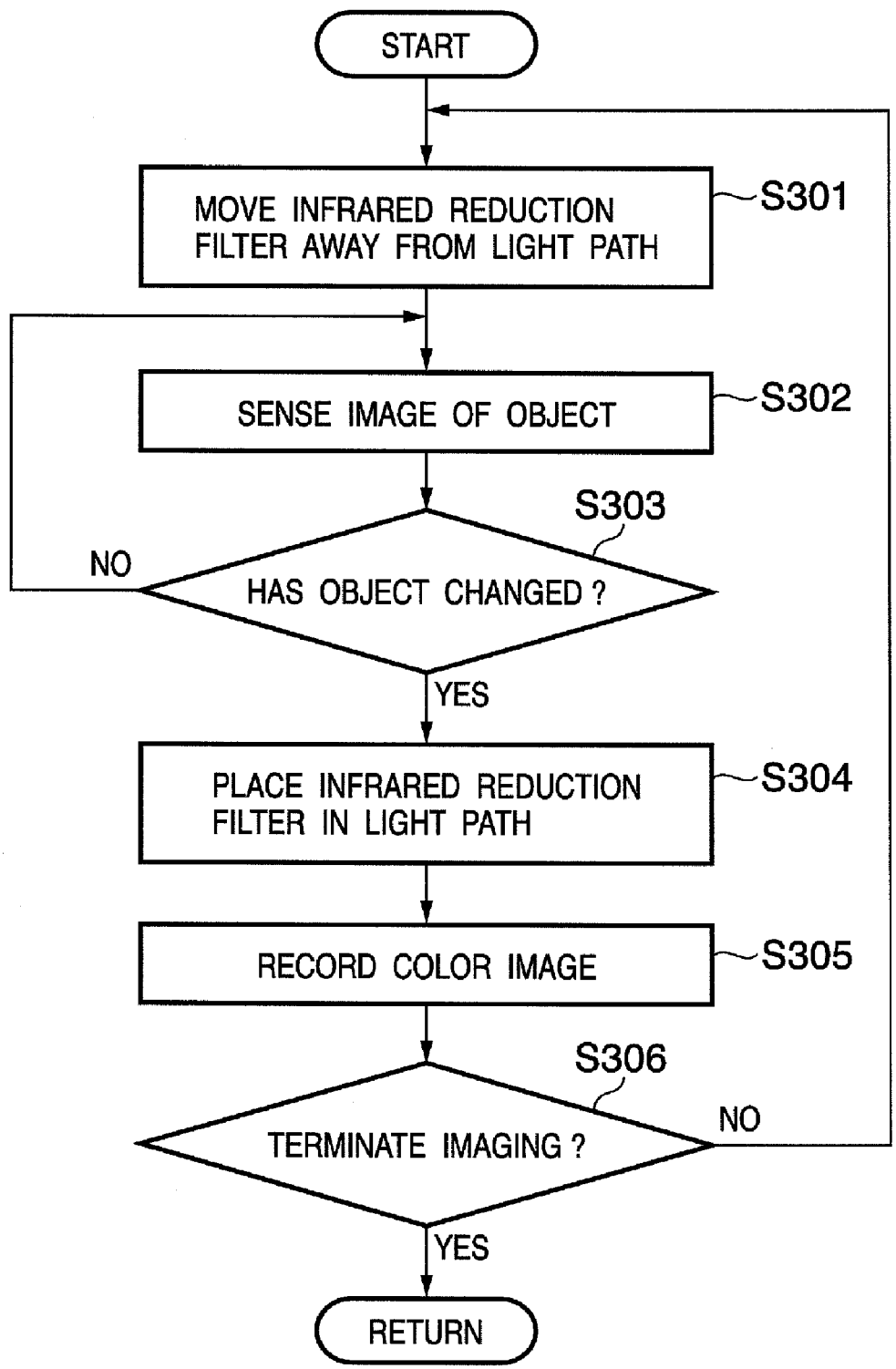
FIG. 3 is a flowchart illustrating an imaging method according to the embodiment.

FIG. 3 is a flowchart illustrating an imaging method according to the embodiment. In step S301, the CPU 151 instructs the infrared reduction control unit 126 to drive the driving motor 123. This is an instruction to move the infrared reduction filter 106 away from the light path. In response to this instruction, the infrared reduction control unit 126 drives the driving motor 123, thereby moving the infrared reduction filter 106 away from the light path.

In step S302, the CPU 151 transmits an imaging instruction to the imaging control unit 143. In response to this instruction, the imaging control unit 143 reads out an image signal from the imaging device 141, and outputs the readout image signal to the imaging signal processing unit 142. Note that image data is formed from the image signal and written in the RAM 154.

In step S303, the CPU 151 determines whether the object has changed. More specifically, the CPU 151 detects the motion of the object by comparing a plurality of images by using the motion detection unit 152. If the object has not changed, the flow returns to step S302. If the object has changed, the flow advances to step S304.

In step S304, the CPU 151 drives the driving motor 123 via the infrared reduction control unit 126, thereby placing the infrared reduction filter 106 in the light path.

In step S305, the CPU 151 records a color image on the basis of the image signal acquired by the imaging device 141. This color image may be recorded on the recording medium 156, or transmitted to a predetermined PC via the network interface 157.

In step S306, the CPU 151 determines whether to terminate monitoring. If monitoring is to be continued, the flow returns to step S301; if not, the CPU 151 terminates the recording process.

In this embodiment, a recording trigger can be suitably detected even in a low-brightness or low-light-intensity environment by disabling the infrared reduction filter. When recording is to be performed, on the other hand, a color image is recorded by enabling the infrared reduction filter. Accordingly, a person or the like can be readily recognized from a recorded image.

Figure 4:
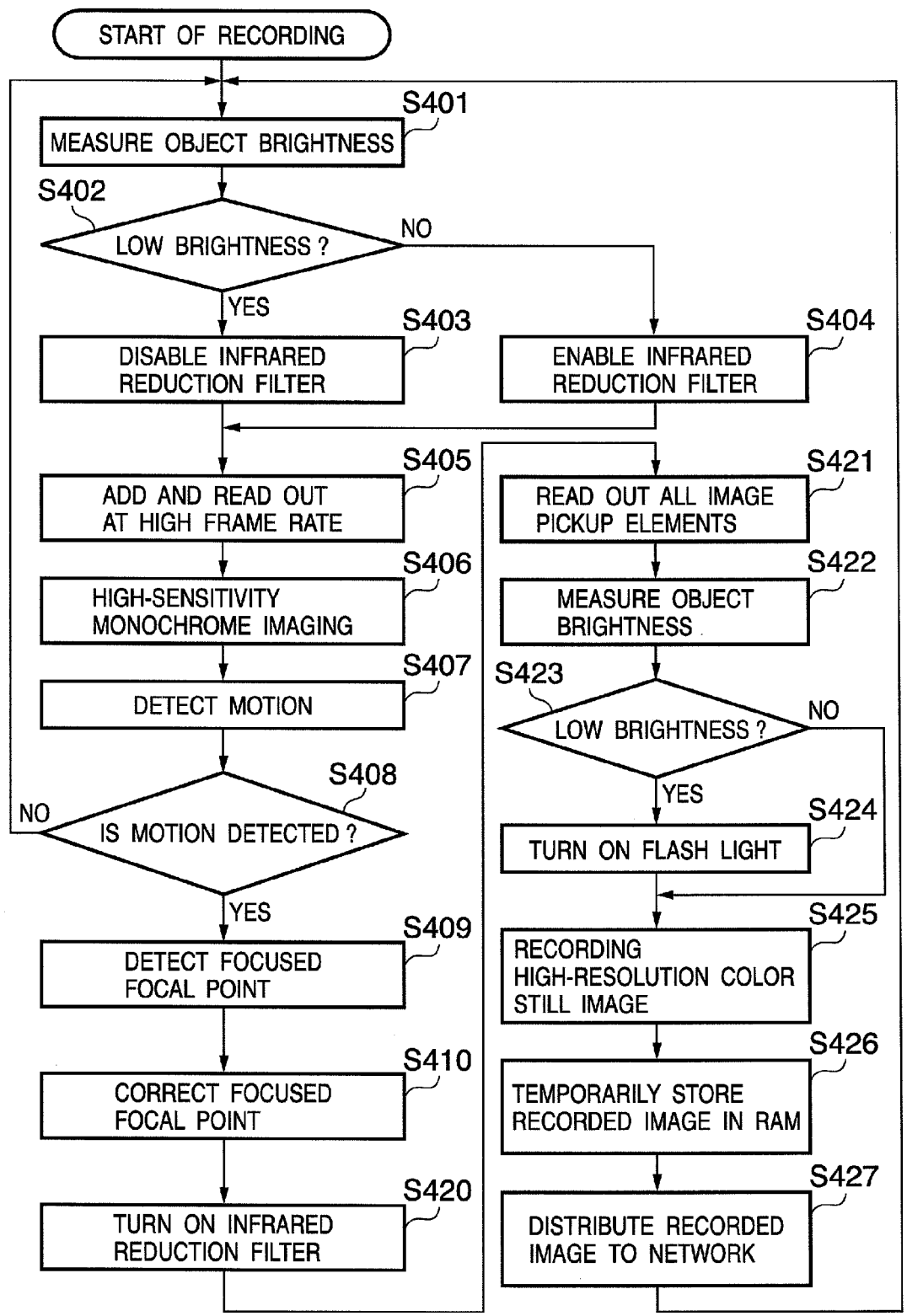
FIG. 4 is a flowchart illustrating another still image sensing method according to the embodiment.

FIG. 4 is a flowchart illustrating another still image sensing method according to the embodiment. Note that this imaging method is the lower concept of the imaging method shown in FIG. 3. In step S401, the CPU 151 measures the brightness of an object from an image signal read out from the imaging device 141.

In step S402, the CPU 151 determines whether the object brightness is low. For example, the CPU 151 compares the brightness of the object with a predetermined threshold value to determine whether the brightness is low. The threshold value is empirically determined. If the brightness is low, the flow advances to step S403; if not, the flow advances to step S404, and the CPU 151 performs control such that the infrared reduction filter 106 is placed in the light path. In step S403, the CPU 151 performs control such that the infrared filter 106 moves away from the light path.

In step S405, the CPU 151 adds and reads out image signals from each group of four photoelectric transducers of all photoelectric transducers forming the imaging device 141. The signal addition unit may also be incorporated into the imaging device 141. In this case, whether to read out an image signal from each photoelectric transducer or read out an added image signal can be switched by a control signal from the CPU 151. Also, the CPU 151 sets the imaging signal processing unit 142 so as to read out image signals at a frame rate higher than a normal frame rate. The normal frame rate is a frame rate for recording color images, and is a relatively low frame rate. In step S406, the CPU 151 controls the imaging signal processing unit 142 to sense a monochrome image at high sensitivity.

In step S407, the CPU 151 causes the motion detection unit 152 to execute motion detection by using the image signal acquired at high sensitivity. If no motion is detected, the flow returns to step S401. If a motion is detected, the flow advances to step S409.

In step S409, the CPU 151 causes the focus control unit 135 to detect a focused focal point. In step S410, the CPU 151 corrects the focused focal point for infrared recording and visible light recording.

In step S420, the CPU 151 places the infrared reduction filter 106 in the light path in order to perform color imaging. In step S421, the CPU 151 sets the imaging device 141 so as to read out image signals from all the photoelectric transducers. Consequently, as shown in FIG. 2A, image signals for forming a color image can be acquired.

In step S422, the CPU 151 measures the brightness of the object from the image signals. In step S423, the CPU 151 determines whether the brightness of the object is low. If the brightness is not low, the flow advances to step S425. If the brightness is low, the flow advances to step S424, and the CPU 151 turns on the flash light as a lighting device 124. The flash light of course emits light in synchronism with recording.

In step S425, the CPU 151 records a high-resolution color still image. In step S426, the CPU 151 temporarily stores image data of the recorded color still image in the RAM 154. In step S427, the CPU 151 reads out the image data from the RAM 154, and transmits the image data outside via the network interface 157. After that, the flow returns to step S401. Note that it is also possible to record the image data on the recording medium 156, instead of distributing it to the network. It is of course also possible to display the image on the monitor via the video output unit 158.

In this embodiment as explained above, when a change relating to an object is to be detected, the infrared reduction filter 106 is disabled. Accordingly, a change can be suitably detected even in a low-brightness or low-light-intensity environment. When recording is to be performed, on the other hand, a color image is recorded by enabling the infrared reduction filter 106. Therefore, a person or the like is readily recognizable from the recorded image.

Especially when a change relating to an object is to be detected in this embodiment, image signals output from each group of four photoelectric transducers forming the imaging device 141 are added and read out as an image signal of one image pickup element. Accordingly, the actual sensitivity can be increased. Also, the frame rate can be easily increased because image signals smaller in number than all the pixels forming the imaging device 141 are output. That is, imaging can be executed at a frame rate higher than the frame rate at which imaging is performed by using all the photoelectric transducers forming the imaging device 141. This is because the data transfer rate need not be high if the number of image pickup elements is reduced. When the frame rate rises, the operating speed of AF can also be increased. Note that four photoelectric transducers are grouped into one unit in the above embodiment, but it is needless to say that the number of photoelectric transducers need only be two or more.

Also, in the above embodiment, the number of image pickup elements is reduced by adding image signals from a plurality of photoelectric transducers. However, it is also possible to read out image signals from only some of a plurality of photoelectric transducers. This makes it possible to increase both the frame rate and AF operating speed.

Note that when a color image is to be recorded, the number of image pickup elements is larger than that when a change relating to an object is to be detected, so a high-resolution color image can be acquired. This is advantageous to specify a person or the like. Note also that when a high-resolution color image is to be acquired, the imaging device 141 is set at a relatively low frame rate. This can solve the problem of the data transfer rate as well.

It is also possible to extract a hi-frequency component of an output image signal from the imaging device 141 by the BPF, thereby detecting the focused focal point of the imaging optical system. This is because when a hi-frequency component is used, the focused focal point can be easily detected even in a low-brightness environment.

Furthermore, the lighting device 124 may also execute lighting only when an image is to be recorded, without performing any lighting when a change relating to an object is to be detected. As a consequence, the electric power consumed by the lighting device 124 can be saved. Note that when the camera includes the network interface 157 which transmits recorded color images outside, image data can be erased from the RAM 154, so long-time recording can be readily achieved. Long-time recording can also be easily realized by transferring image data to the removable recording medium 156.

Second Embodiment

Figure 5A:
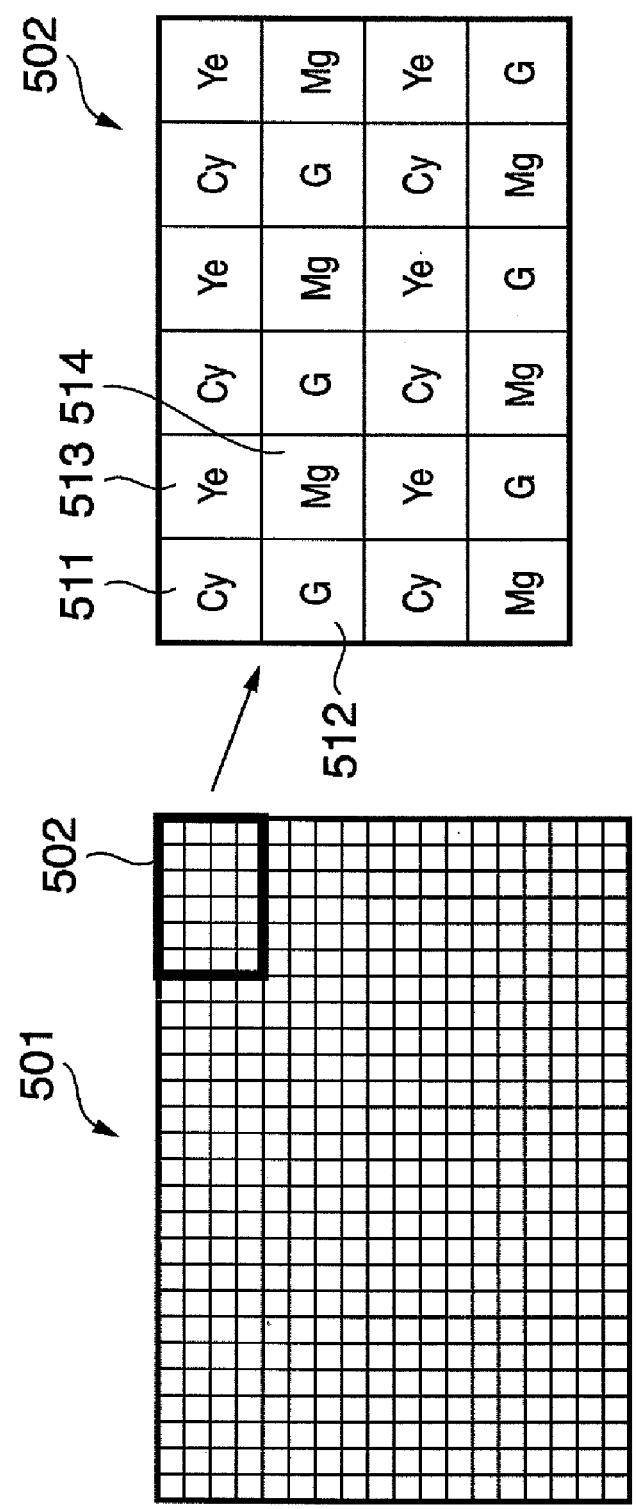
FIG. 5A is a view for explaining the relationship between an infrared reduction filter according to another embodiment and an imaging device when the filter is placed in a light path.

In the second embodiment, an example of moving image recording will be explained. FIG. 5A is a view for explaining the relationship between an infrared reduction filter according to the embodiment and an imaging device when the filter is placed in a light path. Reference numeral 501 denotes the whole effective region of an imaging device 141 to which complementary color filters are adhered. Each square in FIG. 5A indicates one photoelectric transducer. Reference numeral 502 denotes a partial region of the imaging device 141; 511, a photoelectric transducer to which a cyan filter is adhered; 512, a photoelectric transducer to which a green filter is adhered; 513, a photoelectric transducer to which a yellow filter is adhered; and 514, a photoelectric transducer to which a magenta filter is adhered. An imaging signal processing unit 142 reads out an image signal from each photoelectric transducer, and forms a high-resolution color image on the basis of the relationship between the photoelectric transducer and complementary color filter.

FIG. 5B is a view for explaining the imaging device when the infrared reduction filter according to the embodiment is moved away from the light path. Like reference numeral 502, reference numeral 504 denotes the whole effective region of the imaging device 141. Reference numeral 505 denotes a partial region of the imaging device 141. FIG. 5B particularly shows that signals from the four photoelectric transducers 511, 512, 513, and 514 are added and read out as a signal of Cy+Ye+Mg+G. Reference numeral 521 denotes a photoelectric transducer group including the four photoelectric transducers 511, 512, 513, and 514. As can be apparent from FIG. 5B, the light receiver area of the photoelectric transducer group is four times that of one photoelectric transducer. This means that the sensitivity increases.

When an infrared reduction filter 106 is not placed in the light path, all light components in the infrared band are transmitted, so colors cannot be clearly separated by the Cy, Ye, Mg, and G filters. Also, when signals from the four photoelectric transducers are added and read out, only a brightness signal can be obtained. This is because pieces of color information cancel each other out by the addition. However, there is the advantage that an image signal having fourfold sensitivity can be obtained. Therefore, the imaging signal processing unit 142 forms a high-sensitivity, monochrome image by using the image signal obtained at fourfold sensitivity. Note that in the state shown in FIG. 5B, the number of image signals to be read out reduces to ¼, resulting in the advantage that the frame rate is easily increased.

FIG. 6 is a flowchart illustrating a moving image recording method according to the embodiment. Note that this imaging method is the lower concept of the imaging method shown in FIG. 3. In step S601, a CPU 151 measures the brightness of an object from an image signal read out from the imaging device 141.

In step S602, the CPU 151 determines whether the object brightness is low. For example, the CPU 151 compares the brightness of the object with a predetermined threshold value (normal brightness) to determine whether the brightness is low. If the brightness is low, the flow advances to step S603; if not, the flow advances to step S604, and the CPU 151 performs control such that the infrared reduction filter 106 is placed in the light path. In step S603, the CPU 151 performs control such that the infrared filter 106 moves away from the light path.

In step S605, the CPU 151 adds and reads out image signals from each group of four photoelectric transducers of all photoelectric transducers forming the imaging device 141. The signal addition unit may also be incorporated into the imaging device 141. In this case, whether to read out an image signal from each photoelectric transducer or read out an added image signal can be switched by a control signal from the CPU 151. Also, the CPU 151 sets the imaging signal processing unit 142 so as to read out image signals at a frame rate higher than a normal frame rate.

In step S606, the CPU 151 controls the imaging signal processing unit 142 to sense a monochrome image at high sensitivity. In step S607, the CPU 151 causes a motion detection unit 152 to execute motion detection by using the image signal acquired at high sensitivity. If no motion is detected, the flow returns to step S601. If a motion is detected, the flow advances to step S609. In step S609, the CPU 151 causes a focus control unit 135 to detect a focused focal point. In step S610, the CPU 151 corrects the focused focal point for infrared recording and visible light recording.

In step S620, the CPU 151 places the infrared reduction filter 106 in the light path in order to perform color recording. In step S621, the CPU 151 sets the imaging device 141 so as to read out image signals from all the photoelectric transducers. Consequently, as shown in FIG. 5A, image signals for forming a color image can be acquired.

In step S622, the CPU 151 measures the brightness of the object from the image signals. In step S623, the CPU 151 determines whether the brightness of the object is low. If the brightness is not low, the flow advances to step S625. If the brightness is low, the flow advances to step S624, and the CPU 151 turns on a video light as a lighting device 124.

In step S625, the CPU 151 starts recording a high-resolution color moving image. In step S626, the CPU 151 temporarily stores data (moving image data) of the taken color moving image in a RAM 154. In step S627, the CPU 151 reads out the moving image data from the RAM 154, and transmits the readout moving image data to an external apparatus (e.g., a file server) via a network interface 157.

In step S628, the CPU 151 detects the motion of the object by using the motion detection unit 152. In step S629, the CPU 151 determines whether the motion is detected by the motion detection unit 152. If the motion is detected, the flow returns to step S628 to continue moving image recording. If no motion is detected, the flow advances to step S630, and the CPU 151 stops moving image transmission. In addition, in step S632, the CPU 151 turns off the video light. After that, the flow returns to step S601. Note that it is also possible to record the moving image data on the recording medium 156, instead of distributing it to the network. The image may also be displayed on the monitor via a video output unit 158.

Note that FIG. 6 shows no step of executing autofocusing after the focused focal point correction (S610) is executed, but it is of course also possible to continuously execute autofocusing. This is because the distance to an object can successively change during moving image recording. In this case, the focus control unit 135 continuously controls autofocusing even during moving image recording, by using the focused focal point determined in step S610 as a start point.

In the first embodiment, still image recording using the imaging device 141 having the primary color filters is explained. In the second embodiment, moving image recording using the imaging device 141 having the complementary color filters is explained. However, these embodiments are of course mere examples. For example, it is also possible to record still images by using the complementary color filters, or record moving images by using the primary color filters.

The present invention can be applied to a system constituted by a plurality of devices, or to an apparatus comprising a single device. Furthermore, it goes without saying that the invention is applicable to a case where the object of the invention is attained by supplying a program to a system or apparatus.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2005-228472 filed on Aug. 5, 2005, which is hereby incorporated by reference herein in its entirety.

What is claimed is:

1. An imaging apparatus comprising:
an image taking unit which takes an image of an object;
an infrared reduction filter formed in association with said image taking unit;
a filter control unit which controls to move said infrared reduction filter away from a light path associated with said image taking unit when a change relating to an object is to be detected, and which controls to move said infrared reduction filter onto the light path when an image of the object is to be recorded;
a detecting unit which detects a change relating to an object on the basis of a plurality of images taken by said image taking unit;
a recording control unit which records a color image of the object by enabling said infrared reduction filter by said filter control unit, when a change relating to an object is detected; and
a focal point detecting unit which detects a focused focal point of an imaging optical system by using a hi-frequency component of signal components contained in an image signal output from said image taking unit, while said infrared reduction filter is moved away from the light path,
wherein said image taking unit takes the image at a first frame rate when an image of the object is to be recorded, and said image taking unit takes the image at a second frame rate higher than the first frame rate when a change relating to an object is to be detected,
wherein after said infrared reduction filter is moved onto the light path, said image taking unit keeps the focused focal point detected while said infrared reduction filter is moved onto the light path, and said recording control unit records a color image taken by said image taking unit in accordance with the detected focused focal point detected by said focal point detecting unit.

2. The apparatus according to claim 1, wherein when a change relating to an object is to be detected, said image taking unit outputs image signals smaller in number than all pixels forming in said image taking unit.

3. The apparatus according to claim 2, wherein when a change relating to an object is to be detected, said image taking unit reads out only image signals from some of a plurality of pixels included in said image taking unit.

4. The apparatus according to claim 1, wherein said image taking unit takes the color image by using all pixels in an imaging region of said image taking unit.

5. The apparatus according to claim 1, further comprising a lighting unit which disables lighting when a change relating to an object is to be detected, and which enables lighting when the image is to be recorded.

6. The apparatus according to claim 1, further comprising a transmitting unit which transmits the recorded color image outside.

* * * * *